United States Patent
Moeglein et al.

(10) Patent No.: US 8,989,769 B2
(45) Date of Patent: Mar. 24, 2015

(54) POSITIONING SYSTEM USING LIGHT INFORMATION

(75) Inventors: Mark Leo Moeglein, Ashland, OR (US); Lionel J. Garin, Palo Alto, CA (US); Mayur N. Shah, Bridgewater, NJ (US)

(73) Assignee: Qualcomm Incorporated, San Diego, CA (US)

( * ) Notice: Subject to any disclaimer, the term of this patent is extended or adjusted under 35 U.S.C. 154(b) by 768 days.

(21) Appl. No.: 13/244,007

(22) Filed: Sep. 23, 2011

(65) Prior Publication Data

US 2012/0252495 A1     Oct. 4, 2012

Related U.S. Application Data

(60) Provisional application No. 61/431,738, filed on Jan. 11, 2011.

(51) Int. Cl.
*H04W 24/00* (2009.01)
*G01S 19/26* (2010.01)

(52) U.S. Cl.
CPC ........................... *G01S 19/26* (2013.01)
USPC ............... 455/456.1; 455/456.3; 455/456.6

(58) Field of Classification Search
USPC ............ 455/403–404.2, 422.1, 456.1–457
See application file for complete search history.

(56) References Cited

U.S. PATENT DOCUMENTS

| | | | |
|---|---|---|---|
| 2007/0049291 A1 | 3/2007 | Kim et al. | |
| 2007/0049295 A1 | 3/2007 | Soliman et al. | |
| 2008/0058032 A1 | 3/2008 | Yamaji et al. | |
| 2009/0160705 A1 | 6/2009 | Matsuzaki | |
| 2009/0256742 A1 | 10/2009 | Kawaguchi et al. | |
| 2010/0007638 A1* | 1/2010 | Knowles | 345/207 |
| 2012/0220311 A1* | 8/2012 | Rodriguez et al. | 455/456.1 |
| 2013/0183924 A1* | 7/2013 | Saigh et al. | 455/404.2 |
| 2014/0141813 A1* | 5/2014 | Johnson, William J. | 455/456.3 |

FOREIGN PATENT DOCUMENTS

| | | |
|---|---|---|
| EP | 2046087 A1 | 4/2009 |
| GB | 2451616 A | 2/2009 |
| JP | 2001339754 A | 12/2001 |
| JP | 2004157047 A | 6/2004 |
| JP | 2005502889 A | 1/2005 |

(Continued)

OTHER PUBLICATIONS

Partial International Search Report—PCT/US2012/020834—ISA/EPO—Feb. 4, 2012.

(Continued)

*Primary Examiner* — Ajit Patel
(74) *Attorney, Agent, or Firm* — Kilpatrick Townsend & Stockton LLP (57) ABSTRACT

An apparatus and method for initiating a search mode of a mobile device based on the light information in the environment of the mobile device is described herein. The light information may include at least one of color temperature or illuminance, which may be used to determine if the environment of the mobile device is indoors or outdoors. A threshold may be predetermined or adjusted based on received position assistance information. The position assistance information may include at least one of time, day, solar angle, motion information, location information, or weather information.

33 Claims, 4 Drawing Sheets

(56) References Cited

FOREIGN PATENT DOCUMENTS

| | | |
|---|---|---|
| JP | 2007036480 A | 2/2007 |
| JP | 2007064978 A | 3/2007 |
| JP | 2008117424 A | 5/2008 |
| JP | 2009250932 A | 10/2009 |
| JP | 2010054450 A | 3/2010 |
| JP | 2010096686 A | 4/2010 |
| JP | 2010145228 A | 7/2010 |
| WO | WO-03023442 A2 | 3/2003 |
| WO | WO 2009013725 A1 | 1/2009 |
| WO | WO 2009130512 A2 | 10/2009 |

OTHER PUBLICATIONS

Lee, et al., "Illumination-Level Adaptive Color Reproduction Method with LIghtness Adaptation and Flare Compensation for Mobile Display," Journal of Imaging Science and Technology, vol. 51, No. 1, Jan./Feb. 2007, pp. 44-52.

International Search Report and Written Opinion—PCT/US2012/020834—ISA/EPO—Oct. 19, 2012.

* cited by examiner

POSITIONING SYSTEM USING LIGHT INFORMATION

CROSS-REFERENCE TO PENDING PROVISIONAL APPLICATION

This application claims priority under 35 USC 119 to U.S. Provisional Application No. 61/431,738, filed Jan. 11, 2011 and entitled "Positioning System Using Light Information" which is assigned to the assignee hereof and which is incorporated herein by reference.

BACKGROUND

1. Relevant Field

The invention relates to the field of position determination. In particular, the field relates to using light information to aid in position determination.

2. Relevant Background

In order for a mobile device to determine its position, a receiver may need to acquire the signals from one or more satellite vehicles (SV). The initial acquisition of each SV signal can be computationally intensive and may take up to several minutes. These position location operations can be particularly demanding upon system performance; for example an attempted location fix may consume several seconds or more, during which time the mobile device's communication functionality may be diminished. Therefore, it is often valuable for a mobile device to understand the environment in which it is located before searching for satellite positioning systems (SPS) or terrestrial signals.

A mobile device can save power and make better use of its processing power if, for example, a mobile device can be characterized to be indoors, then it may be reasonable to assume that the mobile device is either static or moving at pedestrian speeds. Furthermore, if the mobile device is indoors, it may be reasonable to assume a certain amount of blockage between the mobile device and the open sky, causing SPS signals to be weaker when received at the mobile device. The weak SPS signals may call for searching for signals with greater sensitivity, so that extra processing power can be used to integrate the weak signals to the point where they can be used to provide positioning or timing information. Alternatively, it may be useful to search for stronger, terrestrial signals first, to determine if sufficient accuracy can be provided without having to search longer for SPS signals.

If, for example, a mobile device can be determined to be outdoors, then it may be reasonable to assume less and/or no blockage between the mobile device and the open sky, producing SPS signals to be stronger when received at the mobile device. The strong SPS signals may call for searching for signals more broadly and/or with lesser sensitivity, allowing the extra processing power to be used in other applications.

Therefore, there is a need for a mobile device to understand the environment in which it is located before searching for SPS signals or terrestrial signals.

BRIEF SUMMARY

An apparatus and method for initiating a search mode of a mobile device based on the light information in the environment of the mobile device is described herein. The light information may include at least one of color temperature or illuminance, which may be used to determine if the characterized environment of the mobile device is indoors or outdoors. A threshold may be predetermined or adjusted based on received position assistance information. The position assistance information may include at least one of time, day, solar angle, motion information, location information, or weather information. The threshold may also be adjusted based at least in part upon previously stored position information, image information, illuminance information or color temperature information.

Aspects of the invention include a method of initiating a search mode. The method includes receiving light information based on a environment of a mobile device, determining the characterized environment of the mobile device by comparing the received light information to a threshold; and initiating the search mode based on the characterized environment.

Aspects of the invention include a method of initiating a search mode. The method includes receiving light information based on a environment of a mobile device; receiving position assistance information; adjusting a threshold based on the received position assistance information; determining the characterized environment of the mobile device by comparing the received light information to a threshold; and initiating the search mode based on the characterized environment.

Aspects of the invention include a mobile device. The mobile device includes an image sensor configured to receive light information; a classifier coupled to the image sensor configured to determine the characterized environment of the mobile device by comparing the received light information to a threshold, and initiate a search mode based on the characterized environment; and a SPS receiver coupled to the classifier, configured to search for SPS signals based on the initiated search mode.

Aspects of the invention include an apparatus for initiating a search mode. The apparatus includes means for receiving an image sensor output value based on light information in an environment of a mobile device; means for determining the characterized environment of the mobile device by comparing the received light information to a threshold; and means for initiating a search mode based on the characterized environment.

Aspects of the invention include a storage media having one or more processor readable instructions encoded thereon, when executed by the processor performing initiating a search mode. The instructions include instructions for determining an image sensor output value; instructions for determining a characterized environment of a mobile device by comparing the image sensor output value to a threshold; and instructions for initiating the search mode based on the characterized environment.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION

Figure 1:
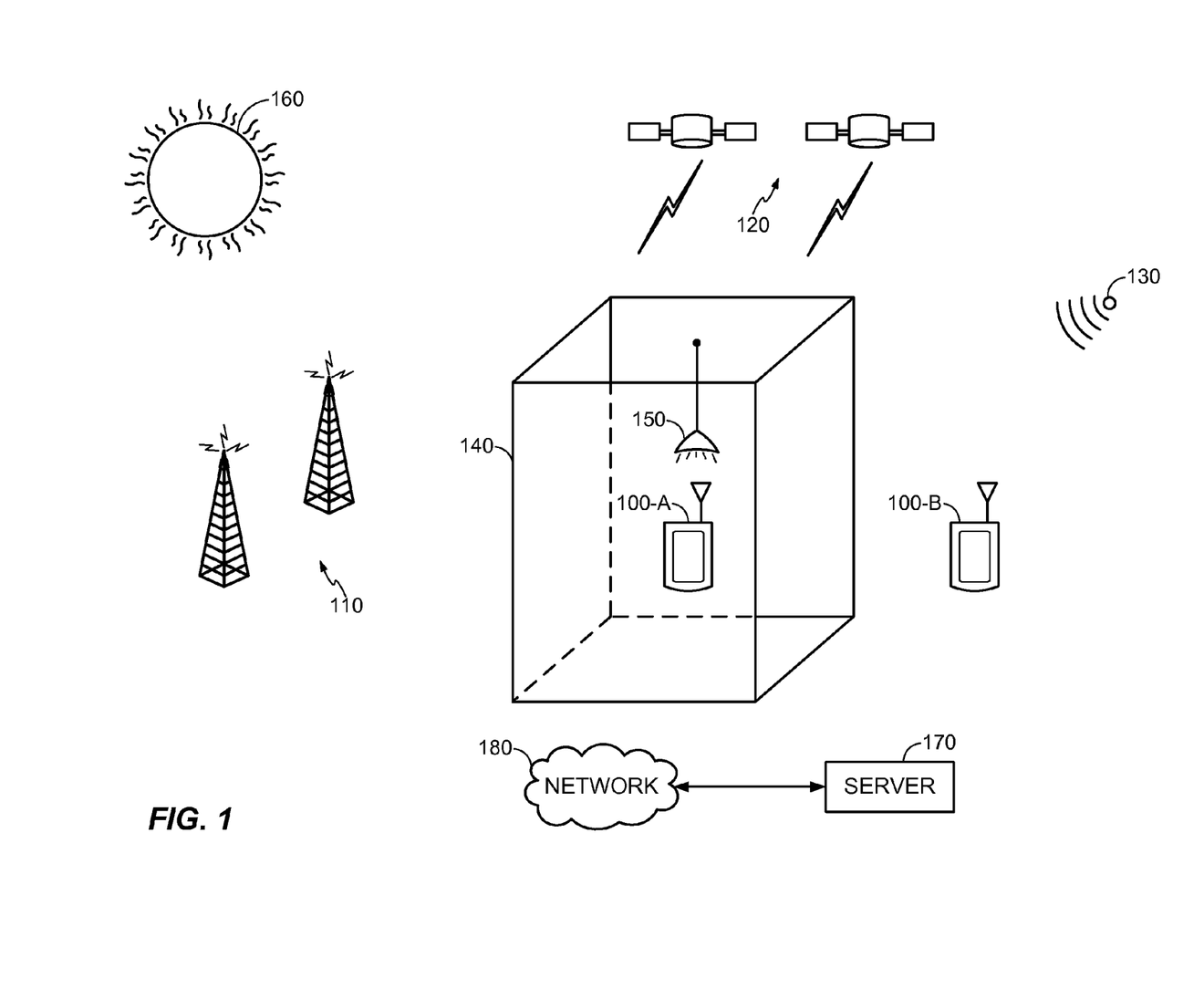
FIG. 1 is a simplified functional diagram of an embodiment of a mobile device in an operating environment.

FIG. 1 illustrates an example of a mobile device 100 that is capable of receiving light information from one or more sources of light in the environment of a mobile device 100, determining a characterized environment of the mobile device 100 by comparing the received light information to a threshold, and initiating a search mode to search for one or more satellite signals based on the characterized environment. The mobile device 100 may be located indoors 100-A or located outdoors 100-B. The source of light may be provided from an indoor location e.g., a light fixture 150, illustrated in FIG. 1 as inside a building 140. Additionally or alternatively, the source of light may be provided from an outdoor location 160. In an example, outdoor sources of light include natural sources of light and indoor sources of light include artificial sources of light. Examples of outdoor sources of light include the sun 160 and moon. The light information provided by outdoor sources of light may be influenced by other factors, for example, the time of the day and/or weather conditions. The mobile device 100 may receive different light information depending on if the sky is clear or overcast. Examples of indoor sources of light include artificial sources such as incandescent light bulbs, fluorescent lamps, studio lamps, xenon lamps, and candle flames. The use of indoor light sources may depend upon the time of day, among other circumstances. For example, light usage in a particular environment may depend upon if there is light outside or not, which may be known from the time of the day.

The mobile device 100 may be, for example, a cellular phone, a GPS receiver, a Personal Navigation Device (PND), and the like, or some combination thereof. The term "mobile device" is not limited to the enumerated example devices, but is intended to include devices such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server 170, such as via the Internet, WiFi, or other network 180, and regardless of whether satellite signal reception, assistance data reception, and/or position-related processing occurs at the mobile device 100, at a server 170, or at another device associated with the network. Any operable combination of the above are also considered a "mobile device." Mobile device may be used interchangeably with mobile station (MS).

The mobile device 100 can implement the capabilities to autonomously locate its geographic position. Autonomous position location architecture is typically referred to as mobile-based position location. Alternatively, or additionally, the mobile device 100 can implement the capability to determine its geographic position in conjunction with one or more elements in a wireless network 180 with which the wireless device is in communication. Such augmented position location architecture is typically referred to as mobile-assisted position location, which may include mobile-assisted or mobile-based implementations. The mobile device 100 may access a network 180, such as the internet e.g., via a cellular tower 110 or wireless access point 130, illustrated in FIG. 1 to obtain position assistance information. The network 180 may be coupled to a server 170, which may be connected to other databases that store information. The server 170 may be, e.g., a dedicated server with a network connection. If desired, several servers may be used. One example of a dedicated server is a Position Determination Entity (PDE). A PDE is a system resource (e.g., a server), that works with one or more SPS receivers, that is capable of exchanging SPS-related information with the mobile device 100. In mobile-assisted, the PDE can send SPS assistance data to the mobile device 100 to enhance the signal acquisition process. The mobile device 100 can return information such as pseudorange measurements back to the PDE, which is then capable of computing the position of the mobile device 100. In mobile-based, the mobile device 100 can send computed position results to the PDE. Another example of a server 170 is a classification server, which may be provided to assist the mobile device 100 in determining its characterized environment. The classification server may comprise, for example, a server or group of servers that are designed and programmed to receive information and process this information to classify the characterized environment of the mobile device 100, or to assist the mobile device 100 in making its determination.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SV) 120, illustrated in FIG. 1. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 100 is not limited to use with an SPS for position determination, as position determination techniques described herein may be implemented in conjunction with various wireless communication networks, including cellular towers 110, femtocells and from wireless communication access points 130, such as a wireless wide area network (WWAN), a wireless local area network (WLAN), a wireless personal area network (WPAN), and so on. Further the mobile device 100 may access online servers to obtain data, such as satellite images, using various wireless communication networks via cellular towers 110 and from wireless communication access points 130, or using satellite vehicles 120 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 2:
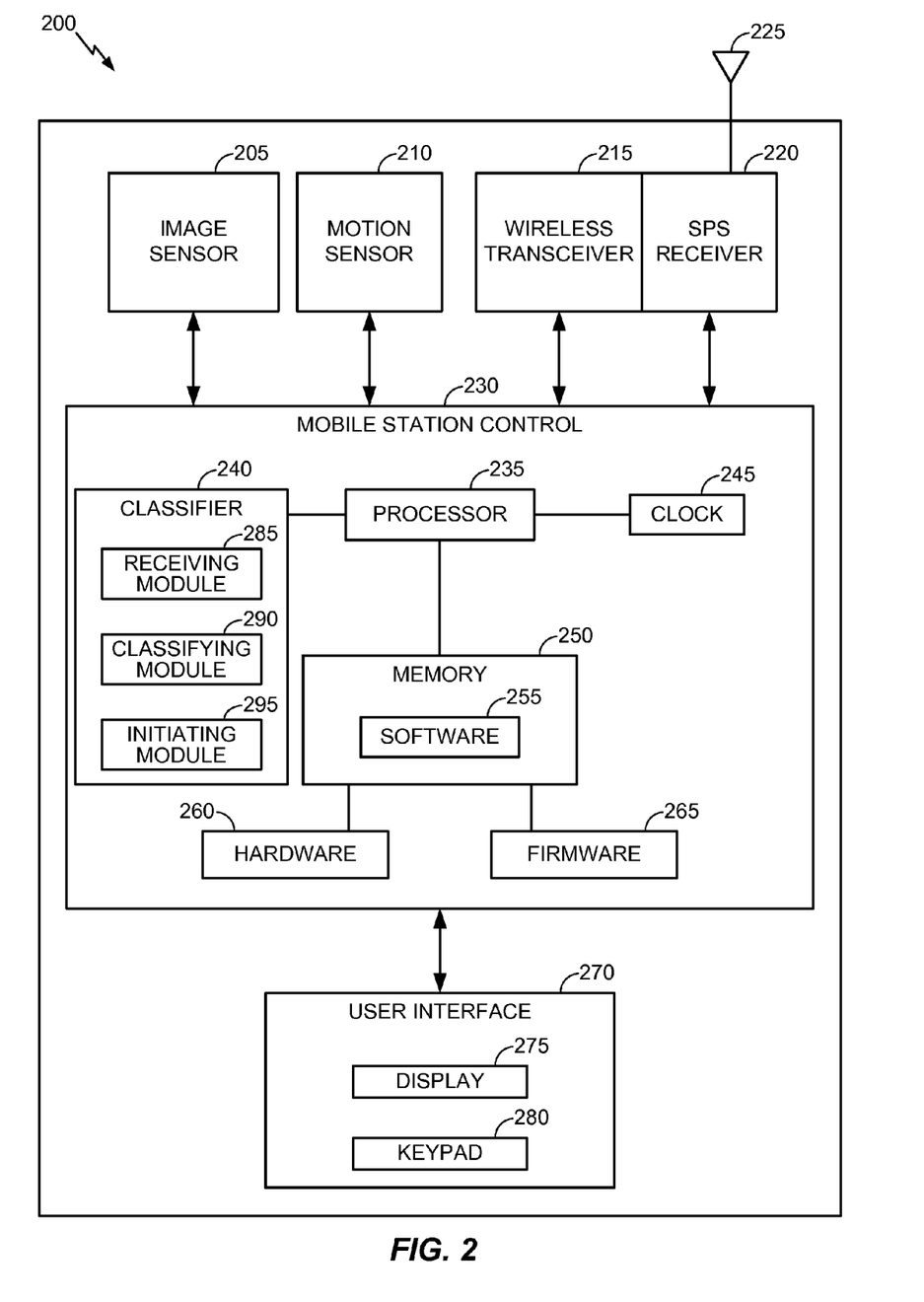
FIG. 2 is a simplified block diagram of an embodiment of a mobile device.

FIG. 2 is a block diagram of the mobile device 200 (the mobile device may be located indoors 100-A or outdoor 100-B), showing a system in which a mobile device 200 can initiate a search mode to receive SPS signals based at least, in part on the light information received. The term "SPS signal", as used herein, is intended to include SPS-like signals from pseudolites or equivalent of pseudolites. As illustrated in FIG. 2, the mobile device 200 may include an image sensor 205. One image sensor 205 is depicted, however, the mobile device 200 may include more than one image sensor, for example one on the front of the mobile device 200 and one on the back of the mobile device 200. An image sensor 205 can be any device capable of receiving light information and producing an output signal and/or value corresponding to the light information received. The term "light information", as used herein, is intended to include any information received at or transmitted from an image sensor 205 which may help determine the characterized environment of a mobile device 200. Examples of image sensors 205 include a camera and ambient light sensor, which may be connected to or be part of the mobile device 200. Other examples of an image sensor 205 include a Charge Coupled Device (CCD), a CMOS camera, optical detectors, and the like or combinations thereof. The image sensor 205 can be configured to capture signals in the visible light spectrum, non-visible light spectrum, and the like or combinations thereof.

In one embodiment, the image sensor 205 may receive a color temperature of a source of light, alternatively referred to as a color temperature of light, in the environment of the mobile device 200. As used herein, "environment" may be construed to include the volume of space from where the image sensor 205, for example a camera, will receive light. Color temperature may be a characteristic of visible light. The color temperature of a light source may be the temperature of an ideal black-body radiator that radiates light of comparable hue to that light source. Because it is the standard against which other light sources are compared, the color temperature of the thermal radiation from an idea black body radiator may be defined as equal to its surface temperature, usually in Kelvin (K). For sources other than ideal black bodies, the color temperature of the thermal radiation emitted from it may differ from its actual surface temperature. For example, the light of an incandescent light bulb may be of thermal origin and can be close to that of an ideal black body radiator. However, many other light sources, such as fluorescent lamps, emit light primarily by processes other than raising the temperature of a body. These sources may be assigned what is known as correlated color temperature (CCT). CCT may be the color temperature of a black body radiator which to human color perception most closely matches the light from the source of light, e.g. a lamp. Color temperature and CCT may be used interchangeably; the use of either term may be construed to be either or both color temperature and CCT.

In another embodiment, the image sensor 205 may receive a color spectrum of light in the environment of a mobile device 200. Other embodiments may include information from the RGB color coordinates, the XYZ color coordinates, and the u,v color coordinates. In one example, an image may be obtained in RGB color coordinates, which may be converted into the XYZ color coordinate system, which may be further converted into the u,v coordinate system, and which may be further converted to into the CCT. In one example, the CCT is used to determine the source of light, however in other examples, the RGB, XYZ, u,v coordinates, and the like or combinations thereof may be used.

In another embodiment, the image sensor 205 may receive the intensity of light in an environment of the mobile device 200. In one example, intensity may be measured in lux. Lux is a unit of illuminance, it may be used as a measure of intensity, as perceived by the human eye, of light that hits or passes through a surface.

In another embodiment, the image sensor 205 may receive both color temperature and intensity. The mobile device 200 may include multiple image sensors, for example a first image sensor may receive color temperature information and a second image sensor may receive intensity information. Alternatively, the mobile device 200 may include a single image sensor 205 to receive the light information, for example both color temperature information and intensity information. Other embodiments may substitute or additionally include information indicative of a color spectrum of light, RGB color coordinates, the XYZ color coordinates, and the u,v color coordinates. For example, an image sensor 205 may include three photosensors, each for sensing a separate color component of ambient light.

As illustrated in FIG. 2, the mobile device 200 may include a motion sensor 210, which may include an accelerometer, magnetometer, gyroscope, compass, and the like or combinations thereof. Motion sensors 210 may include additional or alternative devices, such as pressure sensors and altitude sensors, if desired. In the case of a vehicle, bicycle or wheel chair navigation, additional types of sensors may be a vehicle odometer or wheel tick sensor. Any sensor that may assist in the determination of motion by providing motion information e.g., with respect to direction, rotation, distance, or change in altitude may be considered a motion sensor.

Mobile device 200 includes a satellite positioning system (SPS) receiver 220 that receives signals from a SPS satellites 120 (FIG. 1) via an antenna 225. Mobile device 200 also includes a wireless transceiver 215, which may be, e.g., a wireless network radio receiver and/or transmitter that is capable of sending and receiving communications to and from wireless access point 130 via antenna 225. The mobile device 200 may also include a cellular modem separate from or part of the wireless transceiver 215, which is capable of sending and receiving communications to and from a cellular tower 110. Additionally, the mobile device 200 can receive position assistance information. For example, a serving base station may communicate position assistance information to the mobile device 200 via the wireless transceiver 215. The mobile device 200 can utilize the position assistance information when determining the position fix or can communicate some of the position assistance information to the SPS receiver 220 to assist the SPS receiver 220 in searching for SPS signals. Position assistance information may include any information that may aid in determining the position of a mobile device 200; examples include information indicative of time, date, an approximate location, solar angle, motion information, weather information, obstruction information, image information, and the like or combinations thereof. In other embodiments, the position assistance information may be received from different sources, for example the date and time information may be received from the mobile device 200.

In an example, the image sensor 205, motion sensor 210, SPS receiver 220, and wireless transceiver 215 may be coupled to and communicate with a mobile station control 230. The mobile station control 230 accepts and processes data from the image sensor 205, motion sensor 210, SPS receiver 220, and wireless transceiver 215 and controls the operation of the mobile device 200. The mobile station control 230 may be provided by a processor 235 and associated memory 250, a clock 245, hardware 260, software 255, and firmware 265. The mobile station control 230 may also include a means for receiving an image sensor output, a means for classifying the characterized environment of a mobile device 200 based, at least in part, on the received light information; and means for initiating a search mode based on the characterized environment. In an embodiment, classifier 240 is illustrated separately from the processor 235; in other embodiments, the classifier 240 may be within the processor 235. The classifier 240 helps perform functions as appropriate to determine a mobile device's environment, and it may work together with a server (e.g., classification server). In an embodiment, a classifier 240 can include a receiving module 285 to receive an image sensor output; a classifying module 290 to classify the characterized environment of a mobile device 200 based, at least in part, on the received light information; and an initiating module 295 to initiate a search mode based on the characterized environment. It will be appreciated that the modules (285, 290, and 295) each may be configured as one or more integrated circuits, program instructions being executed by one or more processors (e.g., classifier 240), or by a combination of both to perform the functionalities described herein. In some embodiments, a threshold may be adjusted at the mobile station control (e.g., at a classifier 240) when determining the characterized environment of a mobile device 200 based on information received at the classifier 240, such as time information, day information, approximate location information, weather information, motion sensor information, and the like or combinations thereof.

It will be understood as used herein that the processor 235 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device 200, and is not to be limited to any particular type of memory or number of memories, or type of media upon which memory is stored.

The mobile device 200 also includes a user interface 270 that is in communication with the mobile station control 230, e.g., the mobile station control 230 accepts data and controls the user interface 270. The user interface 270 may include a display 275 that displays images produced by a camera as well as control menus and positional information. The user interface 270 further includes a keypad 280 or other input device through which the user can input information into the mobile device 200. In one embodiment, the keypad 280 may be integrated into the display 275, such as a touch screen display. The user interface 270 may also include, e.g., a microphone and speaker, e.g., when the mobile device 200 is a cellular telephone.

The methodologies described herein may be implemented by various means depending upon the application. For example, these methodologies may be implemented in hardware 260, firmware 265, software 255, or any combination thereof For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 250 and executed by the processor 235. Memory 250 may be implemented within the processor unit or external to the processor unit 235. As used herein the term "memory" refers to any type of long term, short term, volatile, nonvolatile, or other memory and is not to be limited to any particular type of memory or number of memories, or type of media upon which memory is stored.

For example, software codes 255 may be stored in memory 250 and executed by the processor 235 and may be used to run the processor 235 and control the operation of the mobile device 200 as described herein. A program code stored in a computer readable medium, such as memory, may include program code to determine an image sensor output value, determine and/or adjust a threshold based on information received at the mobile device 200, e.g., time information, day information, weather information, approximate position information, motion sensor information, and the like or any combination thereof. Further, computer readable medium may include program code to compare the determined, adjusted, or predetermined threshold to the image sensor output value received at the mobile device 200. Additionally, the computer readable medium may include program code to determine a characterized environment type of a mobile device 200. Further, the computer readable medium may include program code to initiate a search mode based on the characterized environment.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 3:
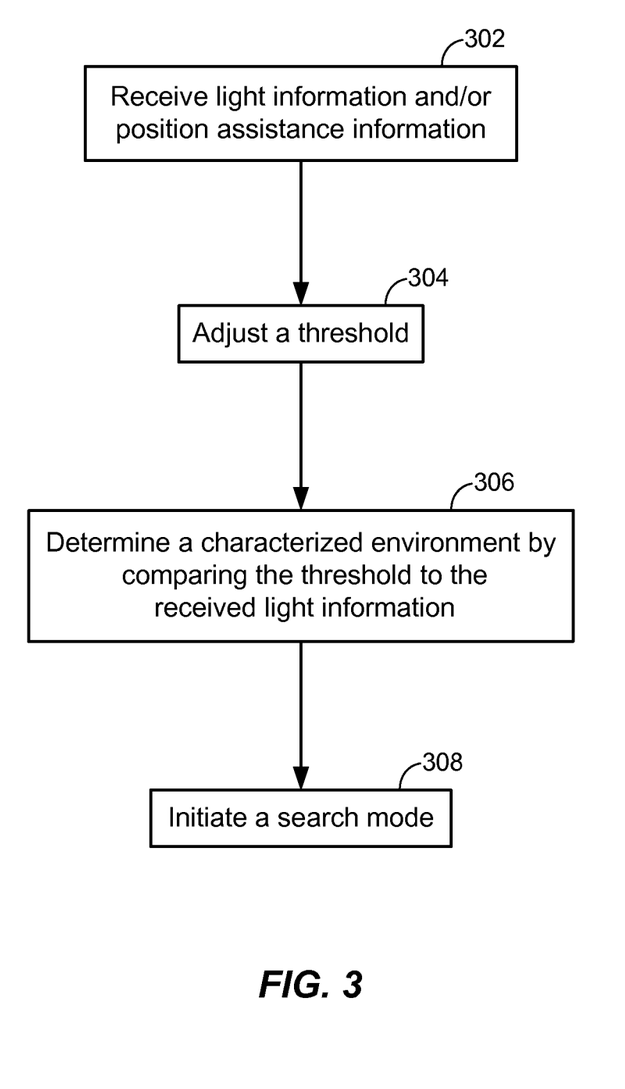
FIG. 3 is a simplified flowchart of an embodiment of a method of selecting a search mode of a receiver.
Figure 4:
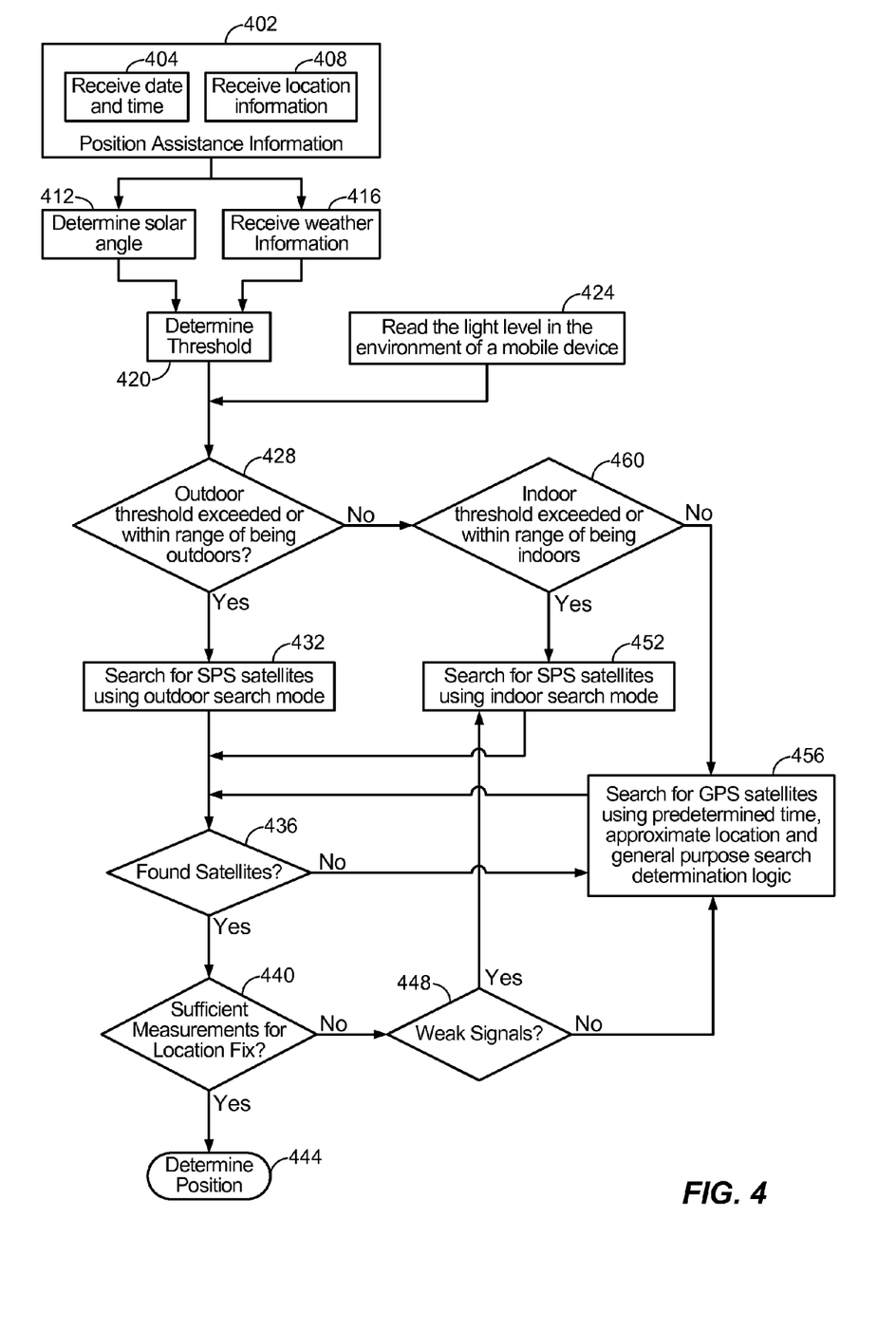
FIG. 4 is a simplified flowchart of an embodiment of a method of selecting a search mode of a receiver.

FIGS. 3 and 4 are simplified flowcharts of an exemplary embodiment of a method classifying the characterized environment of a mobile device 200, and using the resulting classification to control the mobile device 200 to operate more efficiently, thereby conserving system resources. FIG. 3 is a flowchart that illustrates the steps in general terms, and FIG. 4 is a more detailed flow chart. The method can be implemented, for example, on a mobile device of FIG. 1 or 2. The operations shown in FIGS. 3 and 4 may be performed at any suitable place, for example in the mobile device 200 or in a remote server such as a classifier 240 or PDE.

The method begins at block 302, where information indicative of light, date, time, approximate location, motion, and the like or some combination thereof is received at the mobile device 200. As an example, this information may be used to determine an approximate solar angle at the mobile device 200. The solar angle or data used to determine a solar angle may also be determined at a server 170 and sent to the mobile device 200. In another example, the received information may be used to get local weather information, such as clear skies or overcast in the approximate environment of the mobile device 200. The approximate location can include prior known location information and/or location information from SPS, non-SPS sources, or some combination thereof, examples include information received from access points 130 and/or base stations. For example, the approximate location can help determine how the determined solar angle may adjust a threshold. In another example, the mobile device 200 may be used to control the lights in a home or office, and the light information may therefore be known or provided to the mobile device 200.

After receiving information, the mobile device 200 proceeds to block 304, where a threshold may be adjusted. As used herein, "threshold" may be construed to include a value or range which if met or exceeded may control the mobile device 200 in a particular way, e.g. initiate a search mode. As used herein "threshold" may refer to multiple thresholds, for example, a threshold may include an indoor threshold and/or outdoor threshold. An indoor threshold may be used to classify whether a mobile device 200 is receiving light from an indoor source 150; and an outdoor threshold may be used to determine whether a mobile device 200 is receiving light from an outdoor source 160. The reception of an artificial light source does not guarantee that the device is indoors and the reception of natural light does not guarantee that the device is outdoors; rather it can be used as an indicator for the probability of being in a particular location. In some embodiments, the solar angle and/or weather condition information may help determine or adjust a threshold. For example, if the solar angle is determined to be a low value, it may be reasonable to lower the threshold used to determine if the mobile device 200 is likely to be outdoors because the color temperature and/or intensity received at the mobile device 200 will be lower during dawn or dusk, compared to when the solar angle is larger, for example during noon. Daylight may have a lower color temperature near dawn and a higher color temperature during the day. For example the color temperature of light during sunrise or sunset may be approximately 2000K, and the color temperature of light during noon may be approximately 5400K. The threshold used to determine the characterized environment of a mobile device 200, i.e., indoor or outdoor, may by adjusted accordingly.

In another embodiment, the threshold may be adjusted based on information indicative of weather conditions. For example, the color temperature of light during a period of overcast skies may be approximately 6000K, but the color temperature of light during a period of clear skies may be approximately 5400K. Additionally, illuminance of bright sunlight may be approximately 110,000 lux, but the illuminance of a typical overcast day may be approximately 1,000 to 25,000 lux. In some embodiments, the thresholds to determine a characterized environment may be adjusted based on both the solar angle and weather conditions.

In another embodiment, the threshold may also be adjusted based, at least in part, on previously stored: position information, image information, or light information. The previously stored image information may comprise using a stored image of low resolution for power and memory savings. In another embodiment, the threshold may also be adjusted based at least in part on motion information.

After adjusting the threshold, the mobile device 200 proceeds to block 306, where the mobile device 200 determines the characterized environment. The characterized environment may represent the probability or likelihood that a mobile device 200 is in a particular location. The actual environment of a mobile device may be different from the characterized environment. For example, a mobile device 200 may be indoors, but very close to a window with a clear view of the open sky. While the environment may be indoors, the characterized environment in such circumstances may be outdoors. In one embodiment the determined or adjusted threshold is compared to the received light information. The image sensor 205 may receive light information from the environment, and send an output signal to the classifier corresponding to the received light information. Many types of characterized environments can be classified. In an example, classifications may include: indoor, outdoor, stationary, moving, urban, suburban, rural, deep indoor, mid indoor, indoor near window, light, dark, obstructed, unobstructed, tunnel entry, tunnel exit and the like or combinations thereof. The classifications may include characterized environments in addition to those listed. For example, light and dark are listed above as examples; however the classification may include multiple levels scaling from darkest to lightest. In some embodiments, the adjusted threshold is compared to the received light information at a network entity e.g., a server 170.

In an example, tunnel entry and tunnel exit may be determined based, at least in part, on the light information received at a point in time or over a period of time. In another example, position assistance information such as motion information may be used as well.

In some embodiments, the threshold(s) may be predetermined, and therefore the characterized environment type may be determined based on predetermined values, i.e., where thresholds are not adjusted. Table 1 provides an example of data that may be accessed to determine the source of light in the environment of the mobile device 200 based on the color temperature.

TABLE 1

Color Temperature and Corresponding Source of Light

| Temperature (K) | Source |
| --- | --- |
| 1700 | Match flame |
| 1850 | Candle flame |
| 2000 | Sunlight (sunrise or sunset) |
| 2700-3300 | Incandescent light bulb |
| 3350 | Studio "CP" light |
| 4100 | Moonlight, xenon arc lamp |
| 5000 | Horizon daylight |
| 5500-6000 | Typical daylight |
| 6500 | Overcast daylight |
| 9300 | CRT screen |

Table 2 provides an example of data that may be accessed to determine the source of light in the environment of the mobile device 200 based on the illuminance.

TABLE 2

Illuminance and Corresponding Source of light.

| Illuminance (lux) | Source |
| --- | --- |
| 110,000 | Bright Sunlight |
| 20,000 | Mid daylight |
| 1,000-20,000 | Overcast daylight |
| 400 | Sunlight (sunrise or sunset on a clear day) |
| 320-500 | Office lighting |
| 100-200 | Office corridor stairs |
| 80 | Bathroom |
| 50 | Family living room |
| <1 | Moonlight |

In another embodiment, a mobile device 200 may self learn and/or anticipate an environment's light levels based upon statistics over specific access point coverage areas, statistics over a specific region, and the like or combinations thereof. In an embodiment, the statistics may be accessed from a network entity (e.g., a server 170) and provided to the mobile device 200.

In another embodiment, a profile of the typical lighting in a given environment may be observed, location-tagged, and stored in the mobile device, such that it can compare this stored light information profile to later received light information at some point in the future. A time of day stamp may also be used to note historical light information. The mobile device 200 may then compare the qualities of the light information to determine if it is similar to those observed in the past, and therefore correlate some probability that the device is in that same location.

In another embodiment, a mobile device 200 with more than one image sensor 205, for example a front facing camera and back facing camera may also store information regarding which camera yielded useful information. For example, a mobile device laying on a flat surface might gain valuable information from the camera pointed upwards, while the camera pointed downwards received little light. This may be used as an indication that the mobile device 200 has a particular probability of being static and indoors, thus allowing the device to initiate a particular search mode. Furthermore, the device may correlate a up-facing picture with prior up-facing pictures, or decimated versions thereof (less resolution), to determine the likelihood that the mobile device 200 has moved since its last position fix. This correlation process may take place with techniques well-known in the image processing art, such as edge detection, differential decoding, and the like or combinations thereof. If the mobile device 200 is not likely to have moved, it may assign a prior position fix, associated with the time of the stored up-facing photo, as a current position. Likewise, the mobile device 200 may use the prior position fix as an initial position for further location updates. All up-facing photographs may not be repeatable, so the mobile device 200 may implement another logic, for example, to back-track and find other possible positions, in the event that the mobile device 200 has been moved to an environment with very similar photo characteristics. The up-facing nature of the static camera may also be confirmed with accelerometers, detecting gravity in a particular direction. In such a case, the mobile device 200 may select the up-facing camera based upon such accelerometer information and then apply image processing techniques to determine the likelihood of being indoor and/or in an unchanged position.

Optionally, a level of confidence or confidence interval in the classification may be determined, for example on a scale of 0 to 1. The level of confidence may be based on any combination of the available types of data measurement and information available therefrom, such as those listed above.

In another embodiment, once the characterized environment is determined (or light information is received), this information may be used as input to initiate other operations (for example, user experience operations) of the mobile device 200. For example, the mobile device 200 may change the amplitude of its speaker(s) depending on the characterized environment. It may also, for example, ring longer before going to voicemail if the mobile device 200 is characterized to be in a purse or pocket. In another embodiment, mobile device 200 may alter (for example, remove, add, reorder, or modify the font) the applications displayed on a display 275 depending on the characterized environment. For example, certain applications may be more or less useful in outdoor v. indoor environments or in dark v. light environments. In dark environments, LEDs on the mobile device may be used for a flashlight. In bright environments, such an application is unlikely to be useful. Likewise, while a person is indoors, they may be more likely to use typical office applications, whereas while outdoors, they are more likely to use mobility-type applications, such as navigation and phone capabilities. Current weather information is most useful when a user is indoors. When a user is outdoors, the user probably has a good sense of the weather and does not need to consult their mobile device. Thus, a mobile device may more prominently display current weather information when indoors. The device operating system (mobile station control 230) may make this determination based upon pre-stored indoor vs. outdoor application utility metrics, or the determination may be made by individual application that runs on the device.

After determining the characterized environment, the mobile device 200 proceeds to block 308, where based on the characterized environment type classification, the mobile device 200 more efficiently uses its system resources in determining a position. In one example, a search mode to search for SPS signals may be initiated by the classifier 240 sending a control signal to a SPS receiver 220. For example, a search mode may comprise an indoor search mode, outdoor search mode, and general search mode; wherein the search window size may be adjusted. For clarity, three search modes are provided in this example; however, other search modes may also be implemented.

As an example, an indoor search mode may comprise reducing the search window size, alternatively referred to as reducing the pseudorange search space and/or causing the receiver's sensitivity to be increased. Reducing the search window size may comprise reducing the frequency (Doppler shift) and/or the code phase (time). Frequency and code phase comprises a two dimensional space of uncertain frequency on the frequency axis and uncertain code delay on the delay axis. To acquire a SPS signal, a SPS receiver 220 searches frequency and code delay for a SPS signal by scanning one or more search bins. If the frequency and/or delay uncertainty is large, this search may be time consuming. This may be especially true of indoor environments where, in order to obtain needed signal to noise ratio enhancements, an SPS receiver 220 may dwell for periods of several seconds accumulating signal power before advancing search bins. Thus it is beneficial to keep the frequency and delay windows as small as possible, especially for indoor operation. Reducing the search window size allows for signals to be search with greater sensitivity. This can allow the receiver 220 to apply its resources more effectively and search longer for SPS signals. An increased sensitivity can increase the accuracy due to the possibility of acquiring more SPS signals and a higher yield. In another example, an indoor search mode may comprise disabling further SPS searches. For example, if the mobile device 200 is found to be substantially blocked in an indoor environment, further searches may be disabled for a time in order to avoid wasting hardware resources on extensive signal searches. In another example, an indoor search mode may comprise searching for a beacon transmitter, such as a WiFi access point or WWAN base station, rather than attempting to find weak indoor SPS signals. These signals are typically stronger than those from satellites, and therefore require less search time to acquire. In another example, an indoor search mode may comprise searching for signals less often (lowering the fix rate) when the characterized environment is likely to be indoors as the mobile device 200 is unlikely to be moving rapidly, resulting in power savings. In another example, an indoor search mode may comprise initiating a lower power communication mode because the mobile device 200 is likely to be in a low-dynamic environment. In such a case, the mobile device may observe less temperature-change-induced oscillator errors, as well as less Doppler shift in signals due to device motion, and therefore benefit from increased coherent integration in signal search processing. Increasing coherent integration improves sensitivity but may also narrow Doppler response, often requiring the search of multiple Doppler bins. Although this applies to location technology, it is readily applicable to communication signal searches as well.

In another example, an indoor search mode may comprise an inertial navigation mode. In an example inertial navigation mode, the motion sensors 210 may be brought into a high power and/or high frequency mode to determine the position, orientation, and/or velocity (direction and/or speed) of the mobile device 200 when the mobile device's characterized environment is determined to be, for example, tunnel entry. In an example high power and/or high frequency mode comprise receiving motion information on hundred times a second as opposed to ten times a second. The inertial navigation mode may comprise searching for SPS signals less often or disabling SPS signal searches. If the light information determines the characterized environment to be tunnel exit, the outdoor search mode or general search mode, described below, may be initiated.

As an example, an outdoor search mode may comprise increasing the search window size. For example, if a mobile device 200 determines that its environment is outdoors, then the device is likely to see a different signal strength than indoors and it may also have a different expected range of speeds (and therefore device-motion-induced Doppler shift.) Therefore the search window may be adjusted to search for signals more broadly and/or with less sensitivity. In another example, an outdoor search mode may comprise searching for SPS signals prior to searching for beacon transmitters, such as a WiFi access point or WWAN base station. In another example, an outdoor search mode may comprise searching for SPS signals more often (increasing the fix rate).

As an example, a general search mode may comprise searching for SPS signals using a broad and deep method, where signals may be searched with an increased sensitivity and broadly.

FIG. 4 is a simplified flowchart of an exemplary embodiment of a method of classifying the characterized environment of a mobile device 200, and using the resulting classification to control the mobile device 200 to operate more efficiently, thereby conserving system resources.

The method begins at block 402, where position assistance information may be received at the mobile device 200. The position assistance information may be information useful to determine or adjust a threshold, for example, the position assistance information may comprise date information and time information 404, location information, and the like or combinations thereof. The position assistance information may be provided from a local memory 250, from a server 170, or some combination thereof. After receiving the position assistance information, the mobile device 200 may determine a solar angle 412. Alternatively, the solar angle may be determined at a server. In another embodiment, weather information 416 is received as part of the position assistance information or accessed after the position assistance information is received.

The method proceeds to block 420, where a threshold is determined or adjusted based on the received position assistance information or values determined based upon the position assistance information e.g., solar angle 412. The threshold may be stored in local memory 250 or a server 170 (or a database accessed by a server).

At block 424, the light information is received at the mobile device 200, this may occur concurrent to, before, or after the mobile device 200 receives the position assistance information. The mobile device 200 may receive the light information using an image sensor 205.

After a threshold is determined 420 and light information is received 424, the method proceeds to decision block 428, where the outdoor threshold is compared to the received light information to determine if the outdoor threshold is exceeded or within the range of being outdoors. In one embodiment, the comparison occurs at the mobile device 200. In other embodiments, the comparison occurs at a network entity (e.g., server 170), and in other embodiments a portion of the comparison occurs at the mobile device 200 and a portion of the comparison occurs at the network entity. If the measured light information exceeds the outdoor threshold, indicating the mobile device 200 is outdoors, the method proceeds to block 432, where SPS signals are searched using an outdoor search mode. After searching for SPS signals in an outdoor search mode, the mobile device 200 proceeds to decision block 436 to determine if satellites are found.

If satellites are found, the mobile device 200 proceeds to decision block 440 to determine if the SPS receiver 220 has sufficient measurements for a location fix. In other embodiments, the decision block 440 determines if a server has sufficient measurements for a location fix. If sufficient measurements for a location fix are present, a position is determined 444. If, however, sufficient measurements for a location fix are not found, the mobile device 200 proceeds to decision block 448 to determine if weak signals are present. If weak signals are present, the mobile device 200 proceeds block 452, where SPS signals are searched using an indoor search mode. After searching for SPS signals in an indoor search mode, the mobile device 200 again proceeds to decision block 436 to determine if satellites are found (see above discussion for the corresponding methods at this decision block). If however, weak signals are not present, the mobile device 200 proceeds to block 456, where SPS signals are searched using a general search mode. After searching for SPS signals in a general search mode, the mobile device 200 again proceeds to decision block 436 to determine if satellites are found (see above discussion for the corresponding methods at this decision block). In general, if satellites are found, the mobile device 200 proceeds to decision block 440 to determine whether sufficient measurements for a location fix are present. If sufficient measurements for a location fix are present, a position is determined 444; if however satellites are not found, SPS signal are again searched using a general search mode.

If, at decision block 436, satellites are not found, the mobile device 200 proceeds to block 456, where SPS signals are searched using a general search mode. After searching for SPS signals in a general search mode, the mobile device 200 proceeds to decision block 436 to determine if satellites are found (see above discussion for the corresponding methods at this decision block).

If, at decision block 428, the measured light information does not exceed the outdoor threshold, the method proceeds to decision block 460. At decision block 460, an indoor threshold is compared to the received light information to determine if the indoor threshold is exceeded. If the measured light information exceeds the indoor threshold, indicating the mobile device 200 is indoors, the method proceeds to block 452, where SPS signals are searched using an indoor search mode. After searching for SPS signals in an indoor search mode, the mobile device 200 proceeds to decision block 436 to determine if satellites were found (see above discussion for the corresponding methods at this decision block).

If, at decision block 460, the measured light does not exceed the indoor threshold, the method proceeds to block 456, where SPS signals are searched using a general search mode. After searching for searching for SPS signals in a general search mode, the mobile device 200 proceeds to decision block 436 to determine if satellites are found (see above discussion for the corresponding methods at this decision block).

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method of initiating a search mode, the method comprising:
    receiving light information based on an environment of a mobile device;
    receiving motion information from a motion sensor;
    adjusting a threshold based on the motion information;
    determining a characterized environment of the mobile device by comparing the received light information to the threshold; and
    initiating the search mode based on the characterized environment.

2. The method of claim 1, wherein the light information comprises information indicative of at least one of color temperature or illuminance.

3. The method of claim 1, wherein determining the characterized environment comprises at least one of indoor, outdoor, stationary, moving, urban, suburban, rural, deep indoor, mid indoor, indoor near window, dark, light, obstructed, unobstructed, tunnel entry, or tunnel exit.

4. The method of claim 1, wherein determining the characterized environment to be an indoor environment comprises determining the light information to be received from an artificial light source.

5. The method of claim 1, wherein determining the characterized environment to be an outdoor environment comprises determining the light information to be received from a natural light source.

6. The method of claim 1, wherein the threshold comprises predetermined values.

7. The method of claim 1, wherein the search mode comprises at least one of an indoor search mode, outdoor search mode, or general search mode.

8. The method of claim 1, further comprising:
    receiving position assistance information; and
    adjusting the threshold based on the received position assistance information.

9. The method of claim 8, wherein the received position assistance information comprises information indicative of at least one of time, day, solar angle, location information, or weather information.

10. The method of claim 8, wherein adjusting the threshold comprises using stored thresholds based on previously received light information over a specific region.

11. The method of claim 8, wherein adjusting the threshold comprises adjusting an outdoor threshold.

12. The method of claim 11, wherein if the adjusted outdoor threshold is exceeded, initiating an outdoor search mode.

13. The method of claim 12, wherein the outdoor search mode comprises at least one of broadening a search window or decreasing a receiver's sensitivity.

14. The method of claim 11, wherein if the adjusted outdoor threshold is not exceeded, determining if an indoor threshold is exceeded.

15. The method of claim 8, wherein adjusting the threshold comprises adjusting an indoor threshold.

16. The method of claim 15, wherein if the indoor threshold is exceeded, initiating an indoor search mode.

17. The method of claim 16, wherein the indoor search mode comprises at least one of narrowing a search window or increasing a receiver's sensitivity.

18. The method of claim 16, wherein the indoor search mode comprises searching for a beacon transmitter.

19. The method of claim 16, wherein the indoor search mode comprises an inertial navigation search mode.

20. The method of claim 15, wherein if the indoor threshold is not exceeded, initiating a general search mode.

21. The method of claim 20, wherein the general search mode comprises at least one of broadening a search window or increasing a receiver's sensitivity.

22. The method of claim 8, further comprising:
initiating a user experience operation based on the characterized environment.

23. The method of claim 22, wherein the user experience operation comprises modifying an application on a display of the mobile device.

24. A mobile device comprising:
an image sensor configured to receive light information;
a classifier coupled to the image sensor and a motion sensor coupled to the classifier, wherein the classifier is configured to:
receive motion information from the motion sensor and adjust a threshold based on the motion information,
determine a characterized environment of the mobile device by comparing the received light information to the threshold, and
initiate a search mode based on the characterized environment; and
a SPS receiver coupled to the classifier, configured to search for SPS signals based on the initiated search mode.

25. The mobile device of claim 24, wherein the light information comprises information indicative of at least one of color temperature or illuminance.

26. The mobile device of claim 24, wherein the search mode comprises at least one of an indoor search mode, outdoor search mode, or general search mode.

27. The mobile device of claim 24, further comprising a wireless transceiver coupled to the classifier, wherein the wireless transceiver is configured to receive position assistance information and cause the classifier to adjust the threshold.

28. The mobile device of claim 27, wherein the position assistance information comprises at least one of time, day, solar angle, location information, or weather information.

29. The mobile device of claim 24, further comprising a memory coupled to the classifier, wherein the classifier is configured to receive position assistance information from the memory and adjust the threshold based on the received position assistance information.

30. An apparatus for initiating a search mode, the apparatus comprising:
means for receiving an image sensor output value based on light information in an environment of a mobile device;
means for receiving motion information from a motion sensor;
means for adjusting a threshold based on the motion information;
means for determining a characterized environment of the mobile device by comparing the received light information to a threshold; and
means for initiating the search mode based on the characterized environment.

31. The apparatus of claim 30, further comprising means for adjusting the threshold based on received position assistance information.

32. A non-transitory storage medium storage media having one or more processor readable instructions encoded thereon, when executed by the processor performing initiating a search mode, the instructions comprising:
instructions for determining an image sensor output value;
instructions for adjusting a threshold based on motion information received from a motion sensor;
instructions for determining a characterized environment of a mobile device by comparing the image sensor output value to the threshold; and
instructions for initiating the search mode based on the characterized environment.

33. The non-transitory storage media of claim 32, further comprising instructions for adjusting the threshold based on position assistance information.

* * * * *